H. B. LAPP.
FLEXIBLE COUPLING.
APPLICATION FILED JULY 29, 1914.
1,185,209.
Patented May 30, 1916.
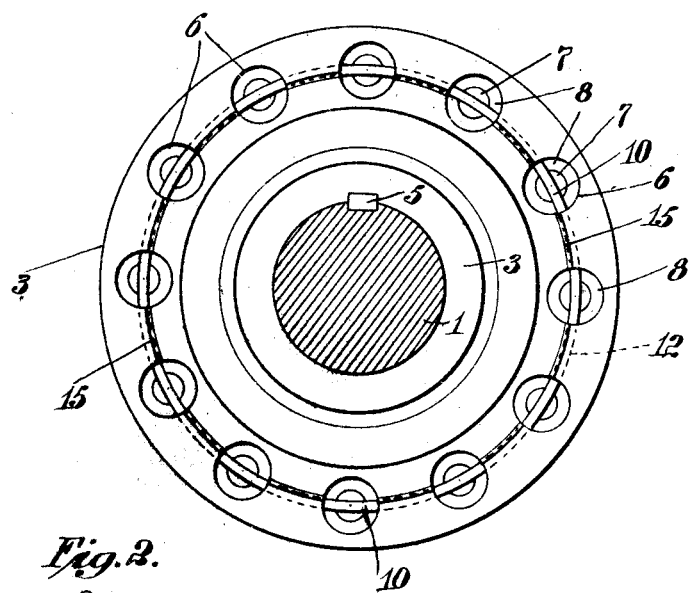
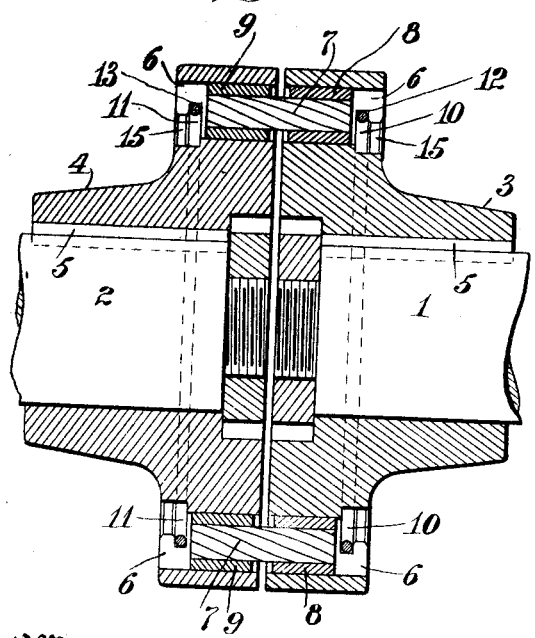
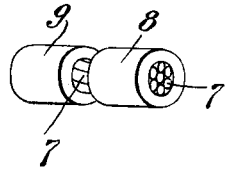

UNITED STATES PATENT OFFICE.

HARRY B. LAPP, OF TRENTON, NEW JERSEY, ASSIGNOR TO DE LAVAL STEAM TURBINE COMPANY, OF NEW YORK, N. Y., A CORPORATION OF NEW JERSEY.

FLEXIBLE COUPLING.

1,185,209. Specification of Letters Patent. Patented May 30, 1916.

Application filed July 29, 1914. Serial No. 853,807.

*To all whom it may concern:*

Be it known that I, HARRY B. LAPP, a citizen of the United States of America, and a resident of Trenton, in the county of Mercer and State of New Jersey, have invented certain new and useful Improvements in Flexible Couplings, of which the following is a specification.

My invention relates to flexible couplings designed to afford a slightly yielding driving connection between rotating shafts, rotating wheels, and other rotating members, *i. e.*, to afford such flexibility that the two members may be slightly out of line or at a slight angle to one another, or both; and the flexible connection herein described also provides such resilience as suffices to absorb, and prevent undue transmission of, sudden shocks.

My invention comprises a coupling member consisting of a short length of wire cable provided at its ends with encircling sleeves whereby stress is applied efficiently to such cable section and whereby an efficient sliding bearing is provided between the coupling member and each of the two rotating members between which power is to be transmitted. My invention also comprises other features as hereinafter set forth.

In a prior application for Letters Patent Serial No. 802,233, filed November 21, 1913, I have illustrated and described a flexible coupling similar to that herein illustrated and described, except that, in the structure specifically illustrated and described in said prior application, one end of each short length of wire cable is secured in fixed relation, *i. e.*, against material endwise movement, with respect to one of the driving and driven members. I have discovered that while it is desirable in some cases to so fasten the flexible connectors or wire cables against endwise movement with respect to one of the driving and driven members, yet it is not necessary to do so in all cases and in some cases it may be preferable not to do so, but to leave such connectors free for a certain amount of sliding motion with respect both to the driving member and to the driven member, merely confining such connectors in such manner that they may not move too far longitudinally. The construction of the present application has the further advantage of being more simple and less expensive.

I will now proceed to describe my invention with reference to the accompanying drawings, and will then point out the novel features in claims.

In said drawings: Figure 1 shows an end view of a shaft coupling embodying my invention. Fig. 2 shows an axial section of such coupling and Fig. 3 is a detail perspective view of one of the flexible connectors.

In the drawings, numerals 1 and 2 designate rotary shafts, of which either may be a driving member and the other a driven member; and numerals 3 and 4 designate coupling disks mounted upon shafts 1 and 2 respectively, and keyed thereto by keys 5 in the ordinary manner. I have not illustrated supporting bearings for shafts 1 and 2, but it will be understood that such bearings are provided, as customary in connection with shafting. The coupling disks 3 and 4 are provided with corresponding registering holes 6 near their peripheries, such holes being adapted to receive the sleeves of the flexible connectors hereinafter described. Fig. 3 shows one of these connectors, comprising a short length of wire cable 7 (shown in this instance as a helically wound cable of ordinary construction) provided at its two ends with sleeves or collars 8 and 9, fitting closely over the ends of the said cable in section 7, and so serving to prevent separation of the strands of such cable section; the said sleeves 8 and 9 also fitting closely within the holes 6 of the coupling disks 3 and 4. These sleeves 8 and 9 may have a drive fit on the ends of the cable section 7 or may be brazed thereon or welded thereto. The sleeves 8 and 9 have reasonably free sliding fit within the holes 6 of the coupling disks, each sleeve of each such connector being free to slide, to a certain extent, within its corresponding hole or bearing 6; the present construction differing in this respect from that specifically illustrated and described in my said prior application, wherein one confining sleeve of each flexible connector was held against axial or sliding motion with respect to the coupling disk in which it was mounted.

To prevent the connectors 7 from working out of engagement with one of the coupling disks altogether, or from moving axially to such extent as to provide insufficient contact surface between it and one of the coupling disks, I provide each coupling disk with retaining means which, while not engaging the flexible connectors 7 ordinarily, limit the possible axial motion of such connectors. In the construction herein described, such limiting means comprises spring rings, 10 and 11, fitting respectively within grooves, 12 and 13, of disks 3 and 4. Each disk, 3 and 4, is provided, on its outside face, with a groove 15 of less width than the diameter of the holes 6, and the grooves 13 and 14 are, in fact, notches in the outer walls of these grooves 15, and are of less radius than the radial distance from the center of the shaft to the outside of the holes 6. It will be clear that the spring rings 10 and 11, when in place within such grooves 12 and 13, effectually prevent the connectors 7 from working out of engagement with the driving and driven members, and yet permit considerable end play of such connectors, as is desirable and practically required in case the shafts 1 and 2 should not be in true alinement.

I am aware that heretofore it has been proposed to transmit power from one shaft or rotary member to another shaft or rotary member, by means of a plurality of short lengths of flexible cable, rigidly secured to the driving and driven members respectively. In such a construction, unless the flexible connectors be of relatively great length, as compared with my construction, the two shafts or rotating members cannot run if materially out of alinement; and one of the principal objects of connectors such as herein described, is to permit the free running of shafts and the like even if out of alinement.

I am also aware that heretofore shaft connectors have been used, which comprise a considerable number of thin flat strips of resilient material. Such connectors are flexible in one direction only, and have to be mounted in the driving and driven members with considerable accuracy, so that they may not be subject to flexural stress except in the direction normal to the broader faces of such flat strips. But the flexible connectors of my invention are equally flexible in all lateral directions and hence do not require to be located in any particular plane; and these members, being free for endwise movement to a certain extent, permit free transmission of power between shafts 1 and 2, and free rotation of such shafts, even though the shafts be out of alinement, either angularly or laterally.

In my said prior application Serial No. 802,233, I have claimed a structure comprising rotary driving and driven members connected by one or more flexible connectors each comprising a short length of stranded cable connected at its ends to said driving and driven members, and arranged approximately parallel to the axes of such members, but well away from the centers thereof, said connector or connectors each having a longitudinal sliding connection with one of said driving and driven members; also a similar structure wherein the ends of the cable connectors are provided with confining sleeves fitting within holes of the said driving and driven members, one of the confining sleeves of each such connector having a sliding connection with one of said driving and driven members; also a similar structure wherein the said confining sleeves fit within eccentric apertures in the driving and driven members, such apertures of greater diameter than the stranded cable of which the connectors are mainly composed; therefore such features are not claimed herein; certain of the claims of said prior application being generic to the structure illustrated and described in said prior application and to the structure herein illustrated and described. In my said prior application I have also claimed the connectors herein employed and hence do not claim such connectors in this application.

What I claim is:—

1. A flexible coupling such as described comprising rotary driving and driven members and one or more flexible connectors therebetween, and arranged to transmit rotary motion from one to the other, and each comprising a short length of stranded cable connected at its ends to said driving and driven members and arranged approximately parallel to the axes of said driving and driven members, but well away from the centers of said driving and driven members, power being transmitted from the driving to the driven member through said connectors, by lateral stress on said connector or connectors, said connector or connectors having each a longitudinal sliding connection with both of said driving and driven members.

2. A flexible coupling such as described comprising rotary driving and driven members and one or more flexible connectors therebetween, and arranged to transmit rotary motion from one to the other, and each comprising a short length of stranded cable connected at its ends to said driving and driven members and arranged approximately parallel to the axes of said driving and driven members, but well away from the centers of said driving and driven members, power being transmitted from the driving to the driven member through said connectors, by lateral stress on said connector or connectors, said connector or connectors having each a longitudinal sliding connection with both of said driving and driven members, and means preventing escape of said connectors from engagement with said driving and driven members, while permitting limited longitudinal motion of such connectors with respect to said driving and driven members.

3. A flexible coupling such as described, comprising rotary driving and driven members and a plurality of connectors connecting such driving and driven members and each located eccentric to and well away from the axis of rotation, each such flexible connector being substantially equally flexible in all lateral directions and having free sliding engagement with both said driving and driven members.

4. A flexible coupling such as described, comprising rotary driving and driven members and a plurality of connectors connecting such driving and driven members and each located eccentric to and well away from the axis of rotation, each such flexible connector being substantially equally flexible in all lateral directions and having free sliding engagement with both said driving and driven members, and means preventing escape of said connectors from engagement with said driving and driven members, while permitting limited longitudinal motion of such connectors with respect to said driving and driven members.

5. A flexible coupling such as described, comprising rotary driving and driven members and a plurality of connectors connecting such driving and driven members and each located eccentric to and well away from the axis of rotation, each such flexible connector being substantially equally flexible in all lateral directions and having free sliding engagement with both said driving and driven members, and spring rings fitting within grooves of said driving and driven members and serving to prevent such connectors from moving out of engagement with the driving and driven members, such spring rings spaced apart from each other a distance materially greater than the length of such connectors.

6. A flexible coupling such as described comprising rotary driving and driven members, and a plurality of flexible connectors therebetween. said driving and driven members having registering apertures, eccentric to the axis of rotation and spaced well away therefrom, for the reception of said connectors. and each having also a groove intersecting said holes but of diameter less than the distance from the center of rotation to the outside of such holes, and means located within such grooves preventing escape of said connectors but permitting limited longitudinal motion thereof.

In testimony whereof I have signed this specification in the presence of two subscribing witnesses.

HARRY B. LAPP.

Witnesses:
A. RITERSON,
D. V. KILROY.